INVENTOR
CHARLES R. HELMS

BY
Carpenter, Ostis and Lindberg
ATTORNEYS

INVENTOR
CHARLES R. HELMS

BY
Carpenter, Ostis and Lindberg
ATTORNEYS

INVENTOR
CHARLES R. HELMS

BY
Carpenter, Ostis and Lindberg
ATTORNEYS

INVENTOR
CHARLES R. HELMS

BY
Carpenter, Ostis and Lindberg
ATTORNEYS

INVENTOR
CHARLES R. HELMS

BY
Carpenter, Osterbo and Lindberg
ATTORNEYS

INVENTOR
CHARLES R. HELMS

BY
Carpenter, Osterhout and Lindberg
ATTORNEYS

INVENTOR
CHARLES R. HELMS

BY
Carpenter, Osth and Lindberg
ATTORNEYS

INVENTOR
CHARLES R. HELMS

BY
Carpenter, Ostis and Lindberg
ATTORNEYS

INVENTOR
CHARLES R. HELMS

BY
Carpenter, Ostis and Lindberg
ATTORNEYS

United States Patent Office

Re. 27,624
Reissued Apr. 17, 1973

27,624
CARRIER CARTON

Charles Robert Helms, Barto, Pa., assignor to Container Corporation of America, Chicago, Ill.

Original No. 3,627,193, dated Dec. 14, 1971, Ser. No. 30,917, Apr. 22, 1970, which is a continuation-in-part of Ser. No. 754,331, Aug. 21, 1968, and a division of Ser. No. 863,049, Oct. 2, 1969. Application for reissue Mar. 29, 1972, Ser. No. 239,416
Int. Cl. B65d *5/02, 75/00*
U.S. Cl. 229—37 R 22 Claims

Matter enclosed in heavy brackets [ ] appears in the original patent but forms no part of this reissue specification; matter printed in italics indicates the additions made by reissue.

ABSTRACT OF THE DISCLOSURE

A discrete group of articles, such as cans or bottles, are enclosed in a carrier sleeve. The articles are arranged in a double row in a carrier sleeve or a basket style carrier, both having gusset folded bottom closure panels. The carriers are applied to container groups in the form of a sleeve as the group moves from a first conveyor reach having a width substantially equal to the width of the double row, and on to a second conveyor reach substantially less in width than the first reach. The sleeve forming the carrier being adapted to move into position around the container group as it moves from the first reach to the second reach to hold the articles stably in the carrier. The sleeve has lower closure elements adapted to embrace the second reach, and structure is provided for moving the lower closure elements into position against the bottom of the group as the group moves from the second reach to a third reach.

This application is a continuation-in-part of application Ser. No. 754,331, filed Aug. 21, 1968, now abandoned, for Enclosed Basket Style Carrier Carton and a division of application Ser. No. 863,049, filed Oct. 2, 1969, now abandoned for Apparatus and Method for Enclosing Container Groups.

It is a principal object to provide a carrier for a group of containers, the carrier being characterized by being formed, from a sleeve having bottom closure flaps with gusset flaps connecting such closure flaps with end panels of the sleeve. The sleeve encloses a container group as the group moves from a first conveyor reach of a relatively wide width to a second conveyor reach of a narrower width where the container group would otherwise be unstable. The bottom flaps and the gusset flaps are moved into closing position as the group and sleeve move from the second conveyor reach to a third conveyor reach.

THE PRIOR ART

The closest prior art which has come to applicant's attention are the following patents:

| | | |
|---|---|---|
| *Powell* | *2,172,090* | *220/115XR* |
| *Ford et al* | *2,268,209* | *220/115XR* |
| *Currie* | *2,675,956* | *229/Digest 9* |
| *Hasselo* | *3,121,523* | *206/65EXR* |
| *Chidsey et al* | *3,157,309* | *229/40XR* |
| *Masch* | *3,521,427* | *53/186* |
| *Ganz* | *3,045,401* | *53/48* |
| *Katogir* | *3,406,493* | *53/48X* |

*The invention herein particularly distinguishes from the teachings of Masch 3,521,427 in that the carrier is formed from a sleeve moving in a particular fashion enclosing articles which would be unstable but for the presence of the sleeve, and the transfer of the loaded sleeve from one reach to another while the bottom closing is effected.*

THE DRAWINGS

Figures 1, 2:
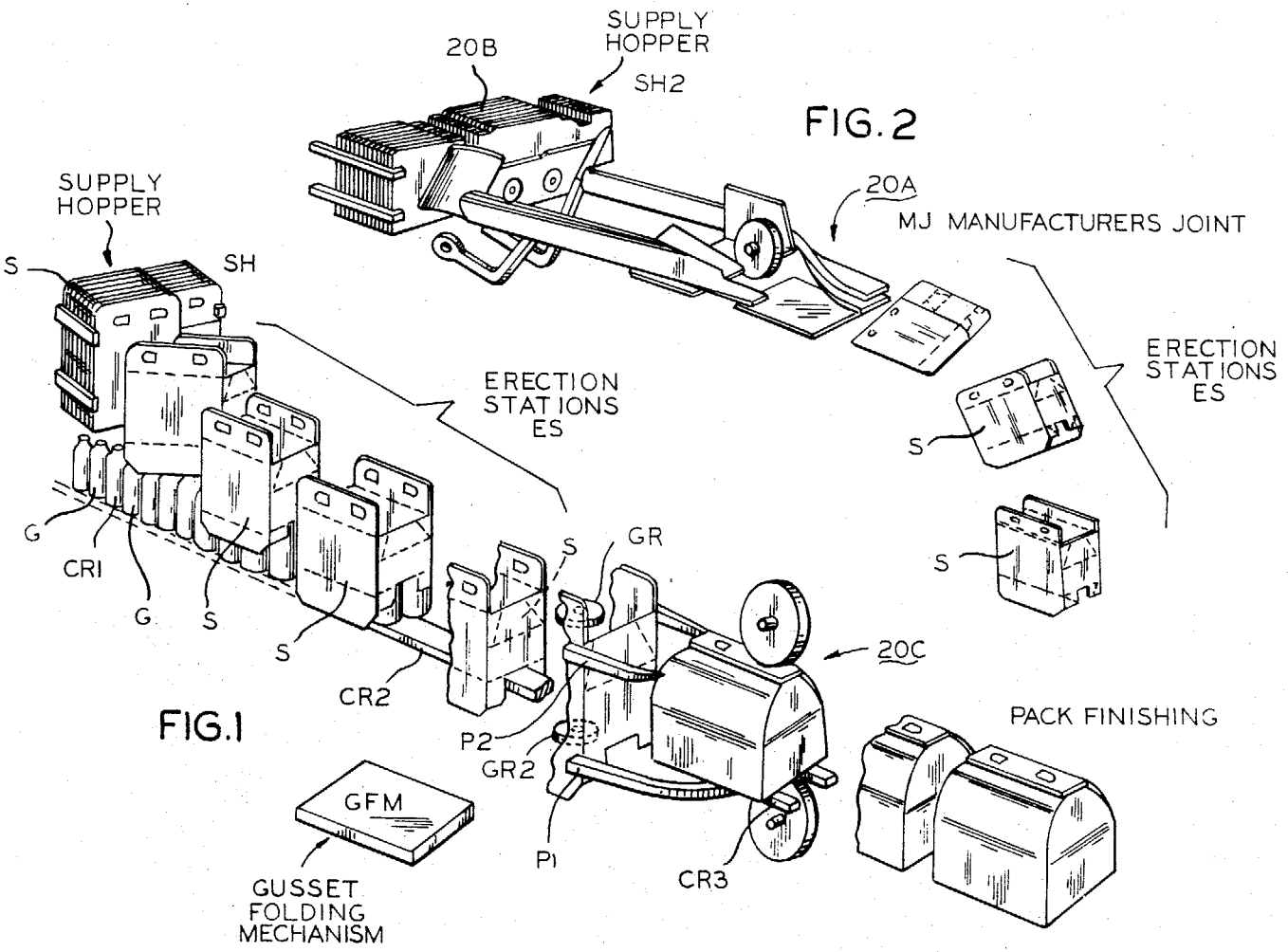
FIG. 1 is a schematic view illustrating apparatus for forming carriers according to the present invention.
FIG. 2 is a view similar to FIG. 1 and showing a modified form of such apparatus.

The apparatus for constructing carriers according to the present invention is denoted by the reference numeral 20 in FIG. 1, and an alternate form of such apparatus is denoted by the reference numeral 20A in FIG. 2. The apparatus of FIGS. 1 and 2 is particularly adapted to act upon a carton sleeve S formed from a cut and scored blank 20B seen in FIG. 9 to provide a resultant carrier 20C seen in FIG. 10.

Cut and scored blank 20B comprises an end panel 21 connected by a fold line 22 to a front panel 23, the latter being connected at a fold line 24 to an opposed end panel 26. A back panel 28 is connected by a fold line 27 to the opposed end panel 26, and panel 28 is connected to a glue flap 29 foldable with respect to the first end panel 21 along a fold line 31 to provide a carton sleeve S.

As seen in FIG. 1, a supply of collapsed carton sleeves is retained in a supply hopper SH, and individual carton sleeves S are withdrawn therefrom and erected at erection stations ES.

The apparatus of FIG. 1 includes a first conveyor reach CR1 for transporting groups of containers G. They are arranged in two rows of three each and may be in the form of throwaway glass containers commonly wrapped in groups of six and referred to in the trade as "six-packs." The container groups G are adapted to move on the first conveyor reach CR1 to a point thereon where an erected carton sleeve S is placed therearound. At such conjunction of the erected sleeve S and a group G of containers, the container group together with the sleeve S then moves to and along a second conveyor reach CR2. The width of this second conveyor reach is greatly less than the width of the first conveyor reach CR1 and the carton sleeve thereby encloses the group of containers G in such a fashion that they cannot spill from the conveyor reach CR2 by reason of the restraint imposed by the sleeve S.

Referring again to FIG. 9, cut and scored blank 20B for forming the carton sleeve S includes a first lower enclosure flap 32 connected to the front panel 23 along a fold line 33. An opposing closure flap 34 is connected to the back panel 28 along a continuation of the fold line 33. Closure flap 32 has a glue path GP thereon, so that closure flap 32 may be placed into overlapping relationship with respect to closure flap 34 to close the bottom of the carton 20C seen in FIG. 10.

First end panel 21 of erected sleeve S has gusset flap elements 36 and 37 extending from the lower end thereof, these flap elements being capable of being folded with respect to each other along a score line 38.

Gusset flap elements 36 and 37 are also defined by a continuation of the score lines 31 and 22 and a continuation of the score line 33 of the front panel 23. Likewise, the opposed end panel 26 has gusset flap elements 39 and 41 foldably connected along a score line 42. One pair of such gusset flap elements is defined by the continuation of the score line 24 and by a continuation of the score line 33, while the other pair of such gusset flap elements is defined by a continuation of the fold line 27 and a continuation of the fold line 33.

Figure 9:
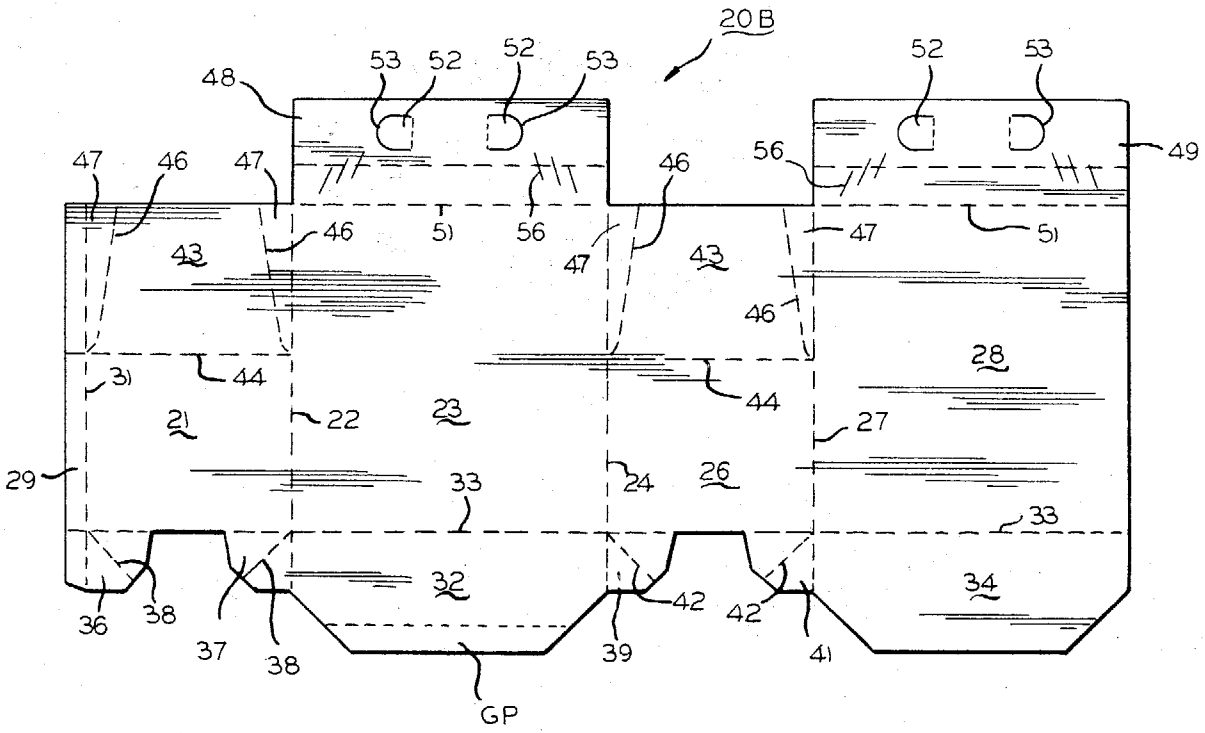
FIG. 9 is a plan view of a cut and scored blank for forming a carton sleeve adapted to be formed into a carrier in the apparataus of FIGS. 1 to 8 inclusive.
Figure 10:
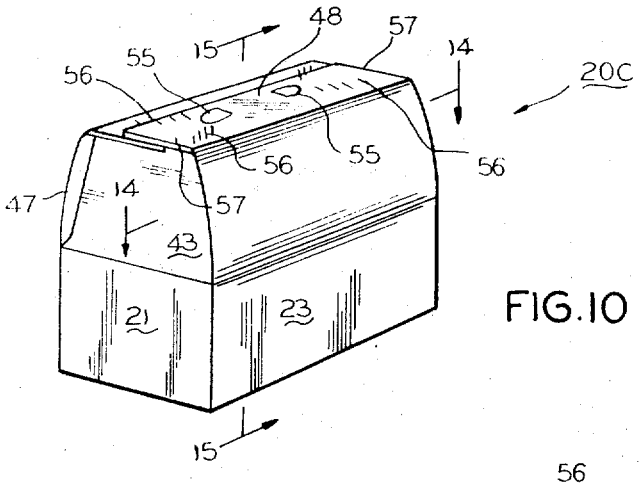
FIG. 10 is an isometric view of a completed carton formed with the apparatus of FIGS. 1 to 8.
Figure 11:
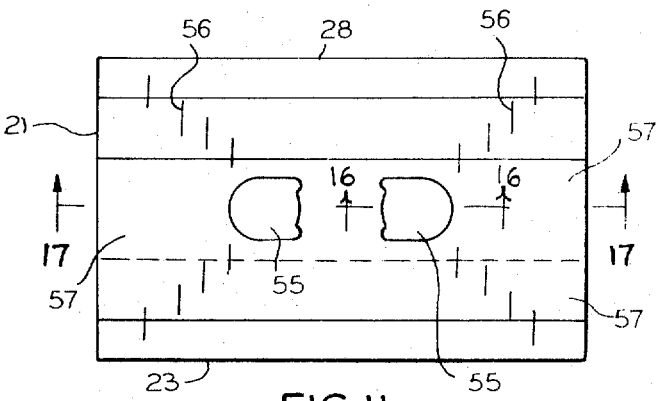
FIG. 11 is a top view thereof.
Figure 12:
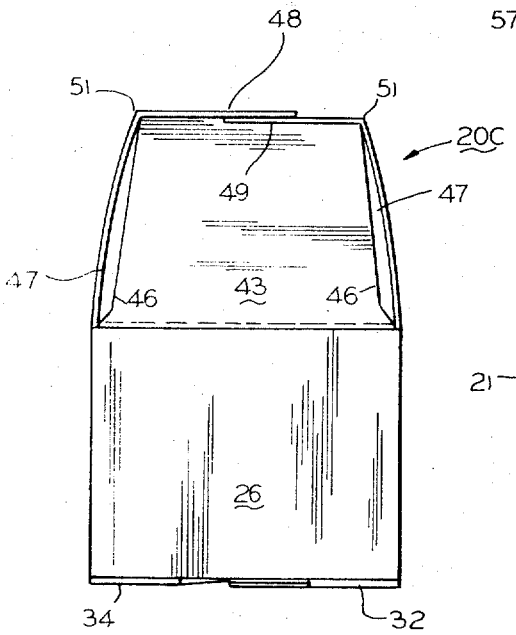
FIG. 12 is an end view thereof.
Figure 13:
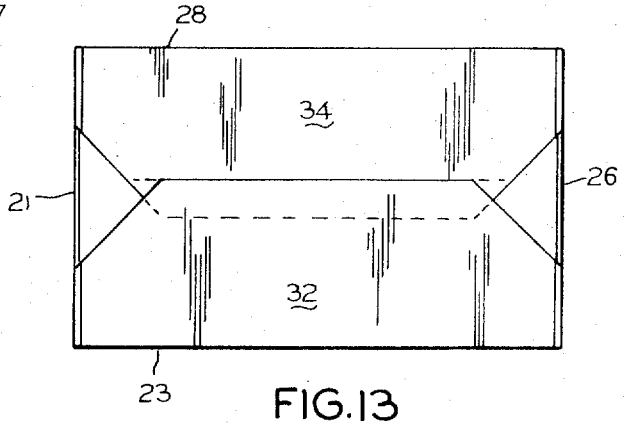
FIG. 13 is a bottom view thereof.
Figure 15:
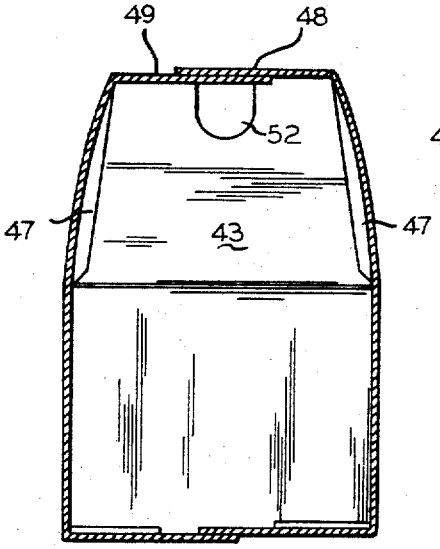
FIG. 15 is a vertical sectional view looking in the direction of the arrows 15—15 of FIG. 10.
Figure 17:
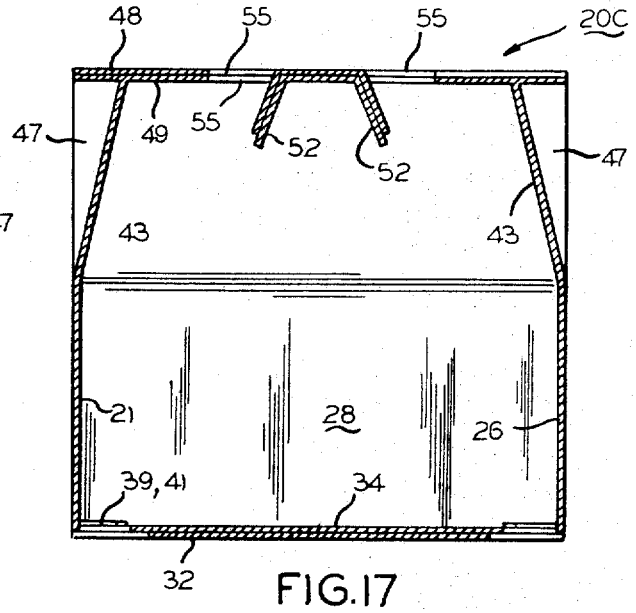
FIG. 17 is a vertical sectional view taken along the line 17—17 of FIG. 11 looking in the direction of the arrows.
Figure 14:
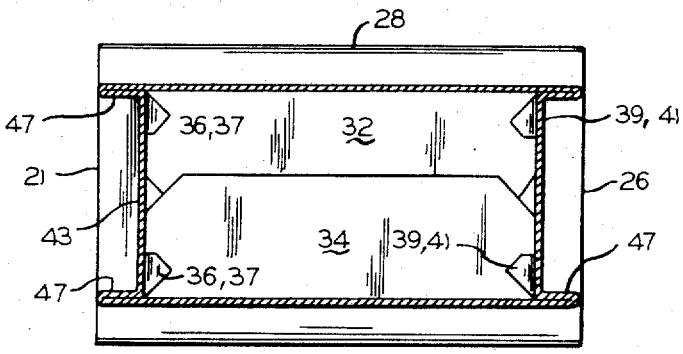
FIG. 14 is a horizontal cross section taken along the plane indicated and looking in the direction of the arrows 14—14 of FIG. 10.
Figure 16:
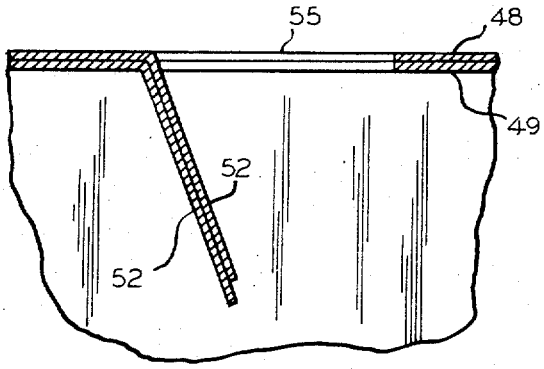
FIG. 16 is an enlarged sectional view taken along the line 16—16 of FIG. 11 looking in the direction of the arrows.

When the blank 20B seen in FIG. 9 is formed into the sleeve S, the gusset flap elements extending from the first end panel 21 and the gusset flap elements extending from the second end panel 26 are spaced at each of such panels by a distance whereby the carton sleeve S can move along the conveyor reach CR2 as seen in FIG. 1, the bottom closure flaps 32 and 34 flanking the conveyor reach CR2.

Alternately, and as seen in FIG. 2, the apparatus of FIG. 1 may include a supply hopper SH2 for a plurality of carton blanks 20B. These are removed from the supply hopper SH2 by the mechanism shown, and a manufacturer's joint may be made in each blank 20B at a station MJ, the sleeve S being erected in the erecting station ES thereof.

It may be noted at this point that the apparatus for forming a carton sleeve and for erecting same, or apparatus including a supply hopper for a plurality of carton sleeves and erecting same are well known in the art and they are therefore not described in detail.

Referring again to FIGS. 9 to 17 inclusive, the carton blank 20B includes a pair of inclined end panels 43 foldable with respect to the first and second end panels 21 and 26 along a fold line 44. The inclined end panels 43 converge towards each other, and each is defined by converging gusset fold lines 46 and by triangular gusset folds 47 also defined by the continuation of the score lines 22, 24, 27, and 31 as the case may be.

An overlapping top flap 48 extends from the front panel 23, and is foldable with respect thereto along a score line 51. An underlapping top flap 49 which extends from the back panel 28 is foldable with respect thereto along a continuation of the score line 51.

Referring back to FIG. 1, as the group of containers moves along the second conveyor reach CR2, gusset folding mechanism GFM acts upon the lower extremities of the carton sleeve S to complete the gusset folding and the closing of the bottom of the container wrapper 20C.

Figure 7:
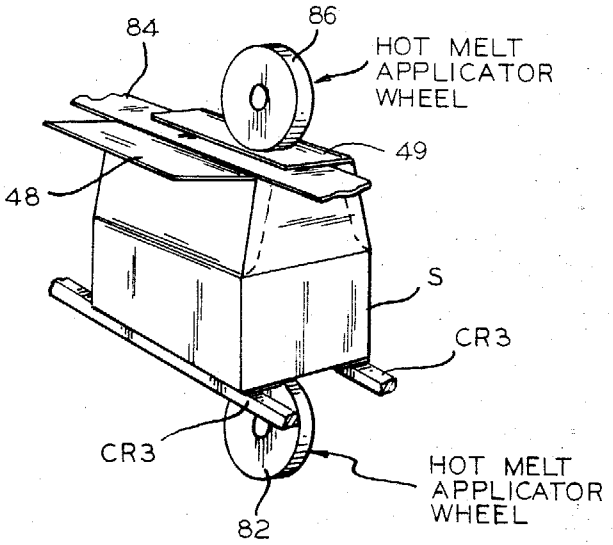
FIG. 7 is a detailed view showing the start of the bottom closure folding and gluing, and the start of the top folding and sealing.

The overlapping and underlapping of top flaps 48 and 49 are glued together in a gluing operation including plows P2 and glue roller GR which places glue against the outer side of flap 49, see FIG. 7. The two flaps 48 and 49 are each provided with fold-down tabs 52 defined by an essentially semicircular cut line 53 and a score line 54. When tabs 52 are folded down, they are in register and define a pair of spaced fingerholes 55 for the transport of the filled container 20C.

The top panels 48 and 49 may also be provided with parallel slits 56, which weaken the top panels 48 and 49 and form thereby end tear panels 57 whereby the top panels 48 and 49 may be opened as desired.

Referring back to FIGS. 1 to 3, the completion of the closing of the bottom of the sleeve S by the gusset folding mechanism GFM includes lower plows P1 and lower glue rollers GR2, and takes place as the sleeve S moves on to a third conveyor reach CR3, the closing of the bottom being completed at this time at that part of the apparatus referred to as pack finishing. The container wrapper 20C is then completed in a number of operations taking place and noted as pack finishing in FIG. 1.

Referring now to FIGS. 3 to 8 of the drawings, there are shown details of the mechanism for completing the gusset folding at the bottom of the container sleeve S, and details of mechanism for forming the gusset fold in a carrier of the types as seen in FIGS. 10 to 17 and FIGS. 18 to 20 inclusive. Refering particularly to FIG. 3, the carton supply hopper SH is adapted to feed individual blanks to a carton erection station ES whence individual sleeves S are moved by a carton delivery system CDS to enclose a container group G as it moves from conveyor reach CR1 to conveyor reach CR2. Carton delivery system CDS consists of an endless chain 61 having carton sleeve engaging devices 62 secured at equally spaced intervals thereon. The endless chains 61 are each trained between paired sprockets 63, 64 and 66, and the grippers 62 may be in the form of mechanical clamps to engage the sides of the carton sleeve S and to deposit same over a carton group G.

As has been previously described, the container group G moves along a first conveyor reach CR1 whereon the containers comprising the group G are stable, and from such conveying reach CR1 to a narrow conveying reach CR2 where the individual containers of the group G are unstable. At such point of transfer of the members of the group G from the wide conveyor reach CR1 to the narrow reach CR2, the carton sleeve S is placed therearound, the sleeve S acting to hold the members of the group G against unstable movement.

Figure 3:
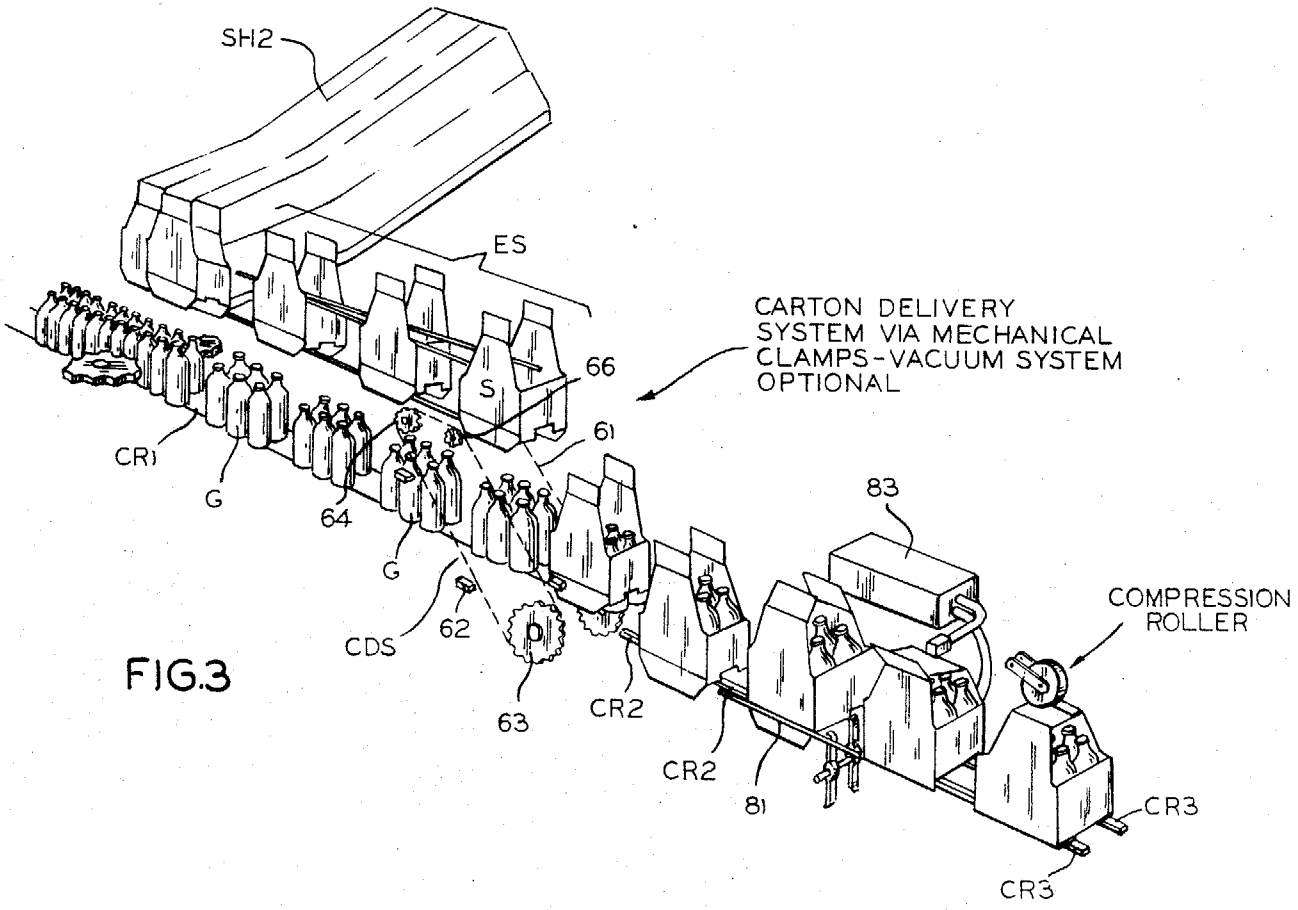
FIG. 3 is a detailed schematic view showing apparatus for feeding carton sleeves to container groups and for forming gusset folds in the bottom extremities thereof.

The carton sleeves S seen in FIG. 3 are of a kind as will be described with reference to FIGS. 18–20 inclusive, and are characterized in that the ends thereof are open, more in the nature of a basket-type carrier.

As an alternate construction, however, carton delivery system CDS may deliver a carton sleeve S on to the group G as it moves on to the narrow conveyor reach CR2, the movement of the sleeve S being achieved by vacuum grippers VG which may (see FIG. 4) revolve with a turret, not shown. The precise configuration of carton delivery system CDS, whether it be by a system as shown in FIG. 3 or that shown in FIG. 4, forms no part of the present invention. It is for that reason that such carton delivery system CDS is shown schematically only.

Figure 5:
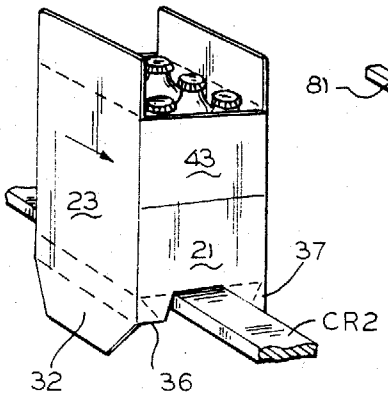
FIG. 5 is a detailed view showing the sleeve in position around a carton sleeve.
Figure 4:
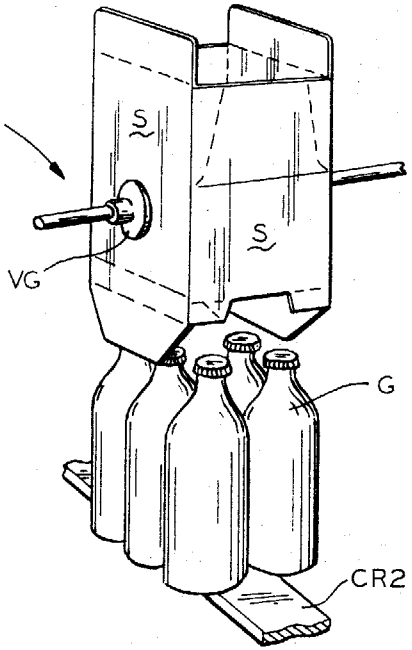
FIG. 4 is a detailed schematic view showing how a carton sleeve moves into position around a container group.

FIG. 5 shows a carton blank of the type disclosed in more detail in FIGS. 10 to 17 moving along the narrow conveying reach CR2. A sleeve S of this type undergoes operations with the group G enclosed therein whereby the end panels 43 are depressed inwardly along the gusset fold lines 46. In addition, the gusset folds 36 and 37 are made prior to folding in of the bottom closure panels 32 and 33.

Figure 6:
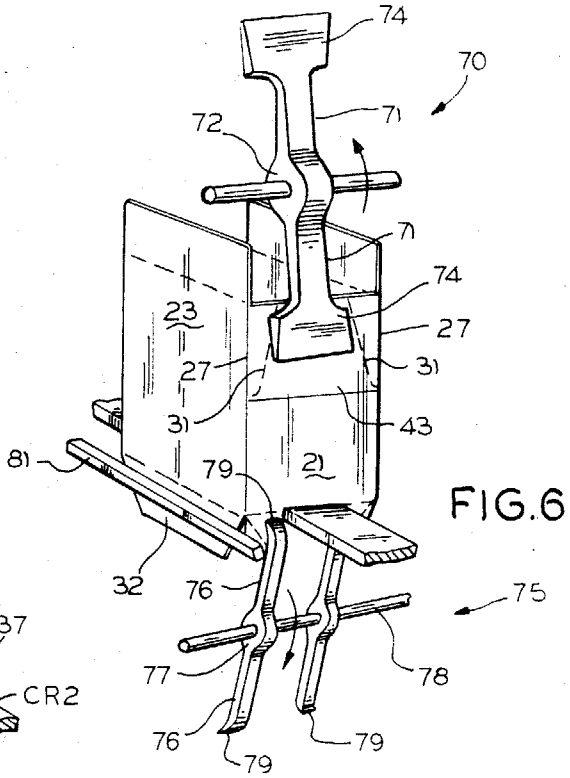
FIG. 6 is a detailed view showing the operation of the gusset folding structure.

As seen in FIG. 6, an upper gusset former is indicated generally by the reference numeral 70 and consists of a pair of paddle arms 71 extending from a central hub 72 made fast to a shaft 73. The distal end of each arm 71 is integral with a paddle 74, and the two arms 71 have an intermittent motion enabling one of the paddles 74 to contact the panel 43 of the leading end of a carton sleeve S to depress panel 43 along its gusset fold line 46 and along score line 27 of the sleeve S. This causes the upper portions of the side panels 23 to be swung inwardly by reason of the configuration of the necks of the containers C within the sleeve S. Following such action of one of the padles 74, the arm 71 rotates with the shaft 73 in the direction indicated by the arrow, the sleeve S passing beneath gusset former 70, the other paddles 74 then moving into contact with the panel 43 at the trailing end of sleeve S. After the depressing of the panel 43 by such paddle 74, the latter remains in stationary position to contact the panel 43 at the leading end of the next sleeve S and group G moving along the conveyor reach CR2.

Mechanism, not shown, is provided for providing intermittent motion to the shaft 73 and to the arms 71 for the purposes aforesaid.

In the same fashion the gusset panels 36 and 37 of leading end panel 21 and the gusset panels 39 and 41 of the trailing end panel 26 are folded by a gusset fold tucker mechanism indicated generally by the reference numeral 75 and including paddle arms 76 extending from central hubs 77 fast upon an intermittently rotating shaft 78 having a motion similar to the shaft 73 of the upper gusset forming mechanism 70 previously described. Each of the arms 76 terminates in a tucker member 79 engageable with the fold lines 38 or 42, as the case may be, of lower gusset panels previously referred to.

The folding of the gusset panels aforesaid causes the lower closure panels 32 and 34 to be folded inwardly, this being accomplished by converging plow rails 81 flanking the conveyor reach CR2, and converging in the direction of movement of the container group G and the sleeve S enclosing same.

Figure 8:
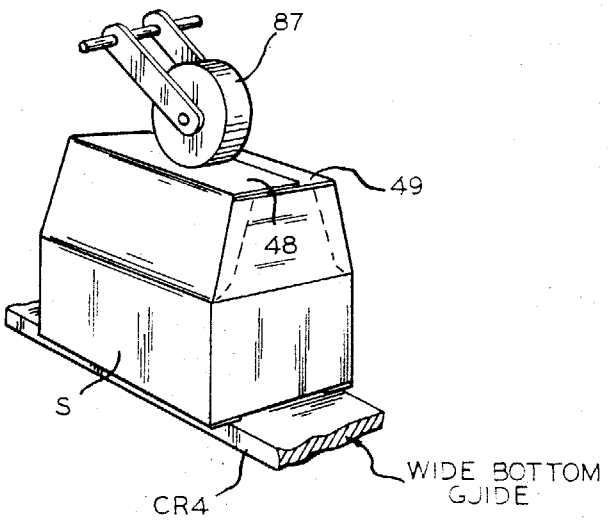
FIG. 8 is a detailed view showing the completion of the top sealing.

Referring now to FIGS. 7 and 8 the pack finishing operation referred to in FIG. 1 includes apparatus for applying glue to the bottom closure flaps 32 and 37. This apparatus includes the glue roller GR2, the operation thereof taking place as the sleeve S moves on to a third conveyor reach CR3. As such movement takes place on to conveyor reach CR3, the narrow reach CR2 terminates, so that a lower pressure wheel 82 places pressure against the lower closure panels 32 and 34 to complete the gluing thereof.

The furnishing of the sleeve S whereby the container group is properly enclosed therein is achieved by hot melt adhesive supplying system 83 seen in FIG. 3 for applying a strip of hot melt adhesive to the upper side of the closure panel 49, the latter being folded against a sword 84, and the hot melt adhesive system 83 having an applicator wheel 86 to apply a film 87 of adhesive to the flap 49.

Thereafter the opposite flap 48 is folded into position over flap 49, and a compression roller 87 seen in FIG. 8 is effective against the upper panels 48 and 49 to finish the carton 8. During this time the carton and the container group G therein move along a final conveyor reach CR4.

Referring now to FIGS. 18 to 21, there is shown a carrier carton C which is formed from a blank B. Carton C is adapted to enclose a plurality of similar articles such as bottles A.

When erected, carton C includes parallel top and bottom walls 90 and 92, which are interconnected by a pair of opposed sidewalls 94. The latter are of the same height as the height of the enclosed articles A and are hingedly connected at their upper and lower edges to related side edges of top and bottom walls 90 and 92.

Sidewalls 94 are hingedly connected at their opposite ends by a pair of opposed end walls 96. It will be noted that end walls 96 are of less height than the height of sidewalls 94 and are each connected to lower portions of related end edges of sidewalls 94 to provide end openings 98 in the upper portions of each end of the carton. The purpose of openings 98 is to provide each access to the articles packaged in the carrier carton C without requiring the carton to be destroyed, as is the case with most wraparound style carrier cartons.

Figure 20:
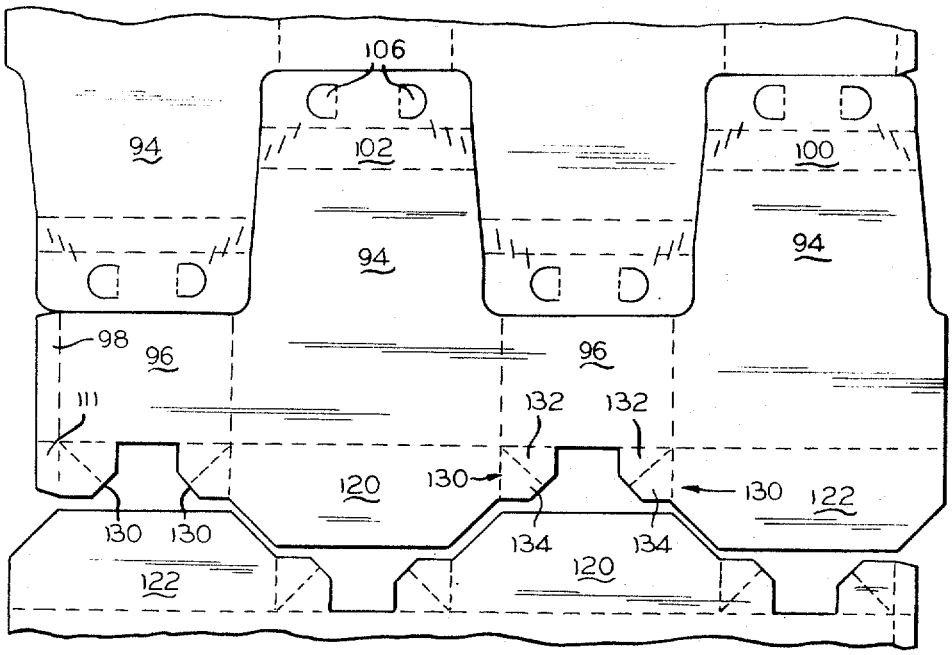
FIG. 20 is a plan view of the blank from which the carton of FIGS. 18 and 19 may be formed and shown in its nesting relationship with a similar blank.

As best seen in FIG. 20 one of the end walls 96 is integrally joined to related sidewalls 94, while the other end wall 96 at one side thereof may be hingedly attached to a glue flap 98 which is in turn adhesively secured to a related marginal edge of adjacent sidewall 94.

Figure 18:
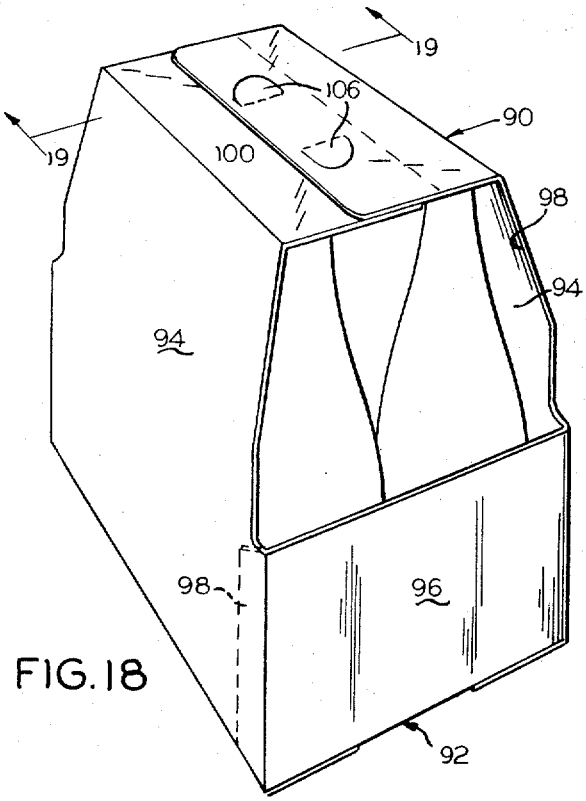
FIG. 18 is a perspective view of an erected and filled carrier according to another embodiment of the invention.
Figure 19:
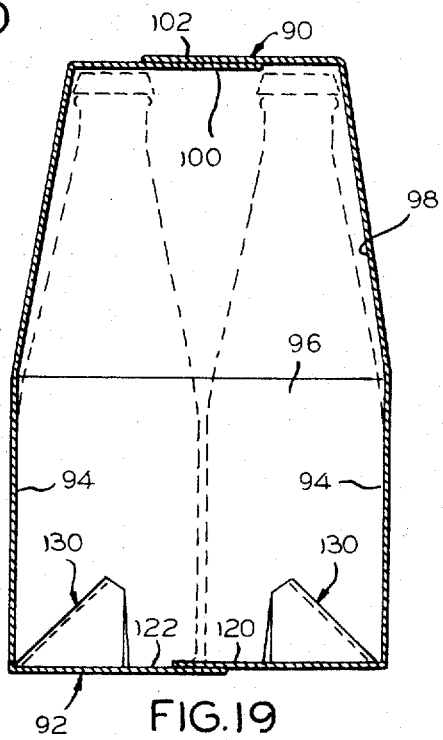
FIG. 19 is a transverse, vertical sectional view taken along line 19—19 of FIG. 18 looking in the direction of the arrows.

As seen in FIGS. 18 and 19, top wall 90 includes a pair of inner and outer panels 100 and 102 which are hingedly attached to the upper edges of adjacent sidewalls 94 and which are folded over into overlapping relationship with each other. These are adhesively interconnected or interlocked as desired, and may also be provided with aligned fingerholes formed from tabs 106 cut from the overlapping portions of the inner and outer panels.

Bottom wall 92 comprises a pair of inner and outer panels 120 and 122 which may be overlapped and adhesively secured to each other or provided with an interlock as may be desired.

Additionally, bottom wall 92 is connected at each end thereof to a related end wall 96 by a pair of bellows or gusset members indicated generally at 130, each of which includes an inner web 132 and an outer web 134 hingedly attached to each other and hingedly attached to related end wall 96 and bottom wall panel 122 or 124. It will be noted that at the end of the blank one of the gusset member outer webs 134 is hingedly attached at one side to an adjacent side of a panel 111 which is an extension of glue flap or connecting flap 98.

Normally the gusset members 130 would be folded to lie against the upper surface of the bottom wall 92. The gusset members may also be connected by adhesive means or any other means if desired to the bottom or end walls.

It will be seen that there has been provided by the unique and novel arrangement described, a partially enclosed carrier that has all the features of a basket style carrier and also the advantages of a wraparound carrier because of the provision of the top wall which is absent in conventional basket style carriers. The openings 98 at the ends of the carton permit the articles to be removed from the carton without destruction of the carton. Another advantage of the carton construction is the feature of nesting the blanks for each carton with similar blanks to utilize a minimum amount of board by eliminating waste in the layout of the carton blanks on the web or sheet of paperboard from which they are formed.

As was previously described, the carton according to FIGS. 18 to 20 inclusive is formed by the apparatus seen in FIGS. 1 to 8. The carton according to FIGS. 18 to 20 is shown in position in the conveying reach CR2 where the sleeve of the carton C holds the group against instability.

Figure 22:
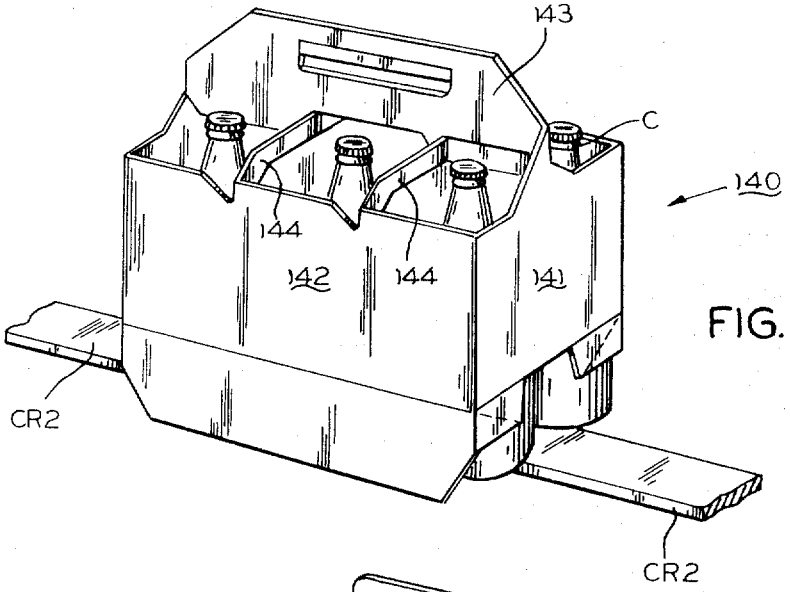
FIG. 22 is a view similar to FIG. 21 showing a basket type carier moving to position enclosing a carrier group subsequently to have its bottom closure panel folded as seen in FIGS. 1 to 8 inclusive.
Figure 21:
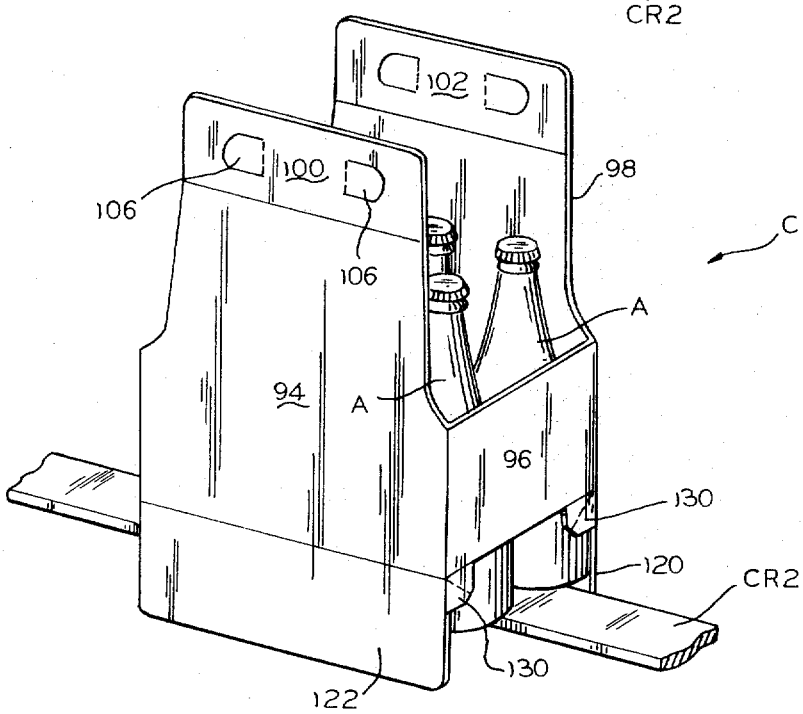
FIG. 21 is a schematic perspective view showing the carrier of FIGS. 18 to 20 moving to position to enclose a container group.

In FIG. 22 there is shown a basket-type carrier referred to generally by the reference numeral 140. It consists of opposed end panels 141 and opposed front and rear panels 142, all foldably connected. Carrier 140 has an integral carrying handle 143 and straps 144 extending therefrom separating containers C from each other.

The gusset folds 130 thereof are each adapted to embrace the conveyor reach CR2, the carton sleeve holding the containers C in a stable fashion folding of gusset folds 130 and forming of the bottom panels in a fashion as has been previously described.

I claim:

1. A partially erected tubular carton in the form of a carton sleeve for articles arranged in side-by-side rows and movable along a first conveyor reach wherein the articles in said rows are stable, and movable to a second conveyor reach having a width less than first reach and wherein said rows are unstable in directions laterally of said second conveyor reach, said carton sleeve being adapted to move into position to enclose said article group as the latter moves from said first conveyor reach to said second conveyor reach, and comprising:

(a) interconnected opposed end and sidewalls;

(b) closure flaps extending from the lower extremities of said sidewalls and depending below said second conveyor reach;

(c) gusset panels connecting each end of said closure flaps with correlative end walls depending below said second conveyor reach and extending laterally on opposite sides thereof;

(d) said gusset panels and said closure flaps being foldable to a position closing the bottom of said sleeve as said sleeve moves from said second conveyor reach to a further conveyor reach.

2. The invention according to claim 1 wherein the upper extremities of said side walls are provided with closure flaps foldable into overlapping relationship with respect to the tops of said articles and are secured together.

3. The invention according to claim 1 including a central partition extending upward beyond said sidewalls.

4. The invention according to claim 2 wherein said end walls have upper portions defined by score lines converging from the corners thereof.

5. A carrier carton, for packaging a plurality of similar articles, formed from a unitary blank of foldable paperboard, in the initial form thereof having a vertically disposed sleeve with a vertically extending manufacturer's joint at one corner thereof, comprising:

(a) an opposed pair of sidewalls each having a height equal to the height of said articles;

(b) an opposed pair of end walls, each being hinged at opposite sides to lower portions of respective sidewalls and having a height equal to the height of said sidewalls to thereby form an end closure panel in upper areas at the ends of the carton;

(c) each of said end walls including an upper portion defined by;

(i) score lines extending in converging directions from adjacent corners of said sleeve;

(ii) gusset panels defined by said sidewalls whereby each of said upper portions may be folded inward.

(d) each of said sidewalls extending in convergent directions near the upper portions thereof upon folding of said gusset panels;

(e) a flat bottom wall including a pair of panels hinged to lower edges of respective sidewalls and secured to each other in overlapped relationship.

(f) a flat top wall parallel to said bottom wall and including a pair of panels hinged to upper edges of respective sidewalls and secured to each other.

6. A carrier carton according to claim 5 wherein said bottom wall is foldably connected at each end thereof to a related end wall by a pair of gusset members each of which includes a pair of web elements hinged to each other and to adjacent edges of a related bottom wall panel and related end wall, respectively.

7. A carrier carton according to claim 5 wherein said end wall is additionally defined by a horizontal score line extending between said converging score lines.

8. A carrier carton according to claim 5 wherein said top wall has a tear-out panel defined by lines of weakness converging from an end of said top wall for removal of an article therefrom.

9. A carrier carton according to claim 5 wherein said upper end wall portion is shiftable in an opposite direction by movement of said gusset panels outwardly from said corners.

10. A carrier carton according to claim 8 wherein the removal of said tear-out panel and the shifting of said upper end portion facilitates removal of an article from said carton.

11. A carrier carton, for packaging a plurality of similar articles, being formed from a unitary blank of foldable paperboard in the initial form of a vertically disposed sleeve with a vertically extending manufacturer's joint at one corner thereof, comprising:

(a) an opposed pair of sidewalls each having a height equal to the height of said articles;

(b) an opposed pair of end walls each being hinged at oposite sides to lower portions of respective sidewalls and having a height substantially less than the height of said sidewalls to thereby form openings in upper areas at the ends of the carton for providing access to said articles;

(c) a flat bottom wall including a pair of panels hinged to lower edges of respective sidewalls and secured to each other in overlapped relation;

(d) a flat top wall parallel to said bottom wall and including a pair of panels hinged to upper edges of respective sidewalls and secured to each other in overlapped relation;

(e) said bottom wall being foldably connected at each end thereof to a related end wall by a pair of gusset members of which includes a pair of web elements hinged to each other and to adjacent edges of a related bottom wall panel and related end wall, respectively.

12. A carrier carton for packaging a plurality of similar articles formed from a unitary blank of foldable paperboard comprising:

(a) opposed pairs of end and sidewalls foldably joined by fold lines to form a rectangular carton structure;

(i) said opposed pair of sidewalls each having a height equal to the height of said articles;

(ii) said opposed pair of end walls, each being hinged at opposite sides thereof to respective sidewalls and having a height equal to the height of said sidewalls;

(b) each of said end walls including an upper portion defined by;

(i) score lines therein extending in converging directions from adjacent corners of said rectangular carton structure;

(ii) gusset panels defined by said score lines and said fold lines whereby each of the upper areas of said end walls may be folded inward;

(c) each of said sidewalls extending in convergent directions with respect to each other near the upper portions thereof upon folding of said gusset panels;

(d) a flat bottom wall including a pair of panels hinged to lower edges of respective sidewalls and secured to each other in overlapped relationship;

(e) a flat top wall parallel to said bottom wall and including a pair of panels hinged to upper edges of respective sidewalls and secured to each other;

(i) said top wall being free from attachment from said end walls.

13. A carrier carton according to claim 12 wherein said top wall is free from said end walls but has bearing contact with the upward folded-in portions thereof.

*14. A partially erected tubular carton in the form of a carton sleeve for articles arranged in side-by-side rows and movable along a first conveyor reach wherein the articles in said rows are stable, and movable to a second conveyor reach having a width less than said first reach and wherein said rows are unstable in directions lateral-*

*ly of said second conveyor reach, said carton sleeve being adapted to move into position to enclose said article group as the latter moves from said first conveyor reach to said second conveyor reach, and comprising:*

*(a) interconnected opposed end and side walls;*

*(b) closure flaps extending from the lower extremities of said side walls and depending below said second conveyor reach;*

*(c) additional closure elements extending from the the lower ends of said end walls and depending below said second conveyor reach and extending laterally thereof;*

*(d) said additional closure elements and said closure flaps being foldable to a position closing the bottom of said sleeve as said sleeve moves from said second conveyor reach to a further conveyor reach.*

*15. The invention according to claim 14 wherein the upper extremities of said side walls are provided with closure flaps foldable into overlapping relationship with respect to the tops of said articles and are secured together.*

*16. The invention according to claim 14 including a central partition extending upward beyond said side walls.*

*17. The invention according to claim 15 wherein said end walls have upper portions defined by score lines converging from the edges thereof.*

*18. A carrier carton, for packaging a plurality of similar articles, said carton being formed from a unitary blank of foldable paperboard, and in the initial form thereof having a vertically disposed sleeve with a vertically extending manufacturer's joint at one corner thereof, comprising:*

*(a) an opposed pair of side walls each having a height equal to the height of said articles;*

*(b) an opposed pair of end walls, each being hinged at opposite sides to respective side walls and having a height equal to the height of said side walls to thereby form an end closure panel in upper areas at the ends of the carton;*

*(c) each of said end walls including an upper portion defined by:*

*(i) score lines extending in converging directions from adjacent corners of said sleeve;*

*(ii) gusset panels defined by said side walls whereby each of said upper portions may be folded inward;*

*(d) each of said side walls extending in convergent directions near the upper portions thereof upon folding of said gusset panels;*

*(e) a bottom closure structure including:*

*(i) a pair of closure panels hinged to lower edges of respective side walls;*

*(ii) additional closure elements hinged to lower edges of said end walls and foldable inward of said end walls;*

*(iii) said closure panels being secured to said additional closure elements and to each other in overlapped relationship;*

*(f) a flat top wall parallel to said bottom closure structure and including a pair of panels hinged to upper edges of respective side walls and secured to each other.*

*19. A carrier carton according to claim 18 wherein said end wall is additionally defined by a horizontal score line extending between said converging score lines.*

*20. A carrier carton according to claim 18 wherein said top wall has a tear-out panel defined by lines of weakness converging from an end of said top wall for removal of an article therefrom.*

*21. A carrier carton according to claim 18 wherein said upper end wall portion is shiftable in an opposite direction by movement of said gusset panels outwardly from said corners.*

*22. A carrier carton according to claim 20 wherein the removal of said tear-out panel nad the shifting of said upper end portion facilitates removal of an article from said carton.*

References Cited

The following references, cited by the Examiner, are of record in the patented file of this patent or the original patent.

UNITED STATES PATENTS

| | | | |
|---|---|---|---|
| 2,172,090 | 9/1939 | Powell | 220—115 X |
| 2,268,209 | 12/1941 | Ford et al. | 220—115 X |
| 2,675,956 | 4/1954 | Currie | 229—DIG. 9 |
| 3,121,523 | 2/1964 | Hasselo | 206—65 E X |
| 3,157,309 | 10/1964 | Chidsey et al. | 229—40 X |

DAVIS T. MOORHEAD, Primary Examiner

U.S. Cl. X.R.

229—40; 220—115; 206—65 E; 229—DIG. 9